United States Patent
Yoon

(10) Patent No.: US 10,019,219 B2
(45) Date of Patent: Jul. 10, 2018

(54) DISPLAY DEVICE FOR DISPLAYING MULTIPLE SCREENS AND METHOD FOR CONTROLLING THE SAME

(71) Applicant: Samsung Electronics Co., Ltd., Suwon-si, Gyeonggi-do (KR)

(72) Inventor: Sung-Jin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 14/013,616

(22) Filed: Aug. 29, 2013

(65) Prior Publication Data
US 2014/0152682 A1 Jun. 5, 2014

(30) Foreign Application Priority Data
Dec. 3, 2012 (KR) .................. 10-2012-0138900

(51) Int. Cl.
G09G 5/00 (2006.01)
G06F 3/14 (2006.01)
G09G 5/393 (2006.01)
G09G 5/395 (2006.01)

(52) U.S. Cl.
CPC .......... *G06F 3/1438* (2013.01); *G06F 3/1446* (2013.01); *G09G 5/393* (2013.01); *G09G 5/395* (2013.01); *G09G 2340/0407* (2013.01)

(58) Field of Classification Search
CPC .... G06F 3/1446; G06F 1/1616; G06F 1/1641; G06F 1/1647; G06F 3/04842; G09G 2300/026; G09G 5/393; G09G 5/395; G09G 2310/0232
See application file for complete search history.

(56) References Cited

U.S. PATENT DOCUMENTS

| | | | | |
|---|---|---|---|---|
| 6,157,396 A | * | 12/2000 | Margulis | G06T 1/20 345/506 |
| 8,300,784 B2 | * | 10/2012 | Choi | H04N 7/147 348/14.03 |
| 8,537,166 B1 | * | 9/2013 | Diard | G06T 1/20 345/1.3 |
| 2005/0168399 A1 | * | 8/2005 | Palmquist | G06F 1/1601 345/1.1 |
| 2012/0075334 A1 | * | 3/2012 | Pourbigharaz | G06F 3/1438 345/619 |
| 2012/0081302 A1 | * | 4/2012 | Gimpl | G06F 1/1616 345/173 |
| 2012/0119977 A1 | * | 5/2012 | Asami | G06F 3/1446 345/1.3 |

(Continued)

FOREIGN PATENT DOCUMENTS

| | | |
|---|---|---|
| KR | 10-0540994 B1 | 1/2006 |
| KR | 10-2010-0058815 A | 6/2010 |

*Primary Examiner* — Hau H Nguyen
(74) *Attorney, Agent, or Firm* — Jefferson IP Law, LLP

(57) ABSTRACT

A method for controlling a display device that displays a frame buffer on a plurality of screens is provided. The method includes receiving a multi-screen mode execution command to display a single frame buffer on a plurality of screens, acquiring the frame buffer, splitting the frame buffer into a plurality of frame buffers to correspond to the plurality of screens, setting an offset for each of the plurality of split frame buffers, and displaying each of the plurality of split frame buffers on an associated one of the plurality of screens based on the set offset.

10 Claims, 9 Drawing Sheets

(56) References Cited

U.S. PATENT DOCUMENTS

| | | | | |
|---|---|---|---|---|
| 2012/0254562 A1* | 10/2012 | Morrison | ............ | G06F 13/4239 |
| | | | | 711/155 |
| 2013/0101210 A1* | 4/2013 | Tang | .................... | H04N 1/3873 |
| | | | | 382/165 |
| 2013/0214995 A1* | 8/2013 | Lewin | .................... | G06F 3/1446 |
| | | | | 345/1.3 |

* cited by examiner

DISPLAY DEVICE FOR DISPLAYING MULTIPLE SCREENS AND METHOD FOR CONTROLLING THE SAME

PRIORITY

This application claims the benefit under 35 U.S.C. § 119(a) of a Korean patent application filed on Dec. 3, 2012 in the Korean Intellectual Property Office and assigned Serial No. 10-2012-0138900, the entire disclosure of which is hereby incorporated by reference.

BACKGROUND OF THE INVENTION

1. Field of the Invention

The present invention relates to a display device for displaying multiple screens and a method for controlling the same. More particularly, the present invention relates to a display device for displaying multiple screens, which can set an offset between the multiple screens, and a method for controlling the same.

2. Description of the Related Art

Desktop computers have at least one display device (for example, a monitor). Mobile devices with a touch screen (for example, cellular phones, smart phones and tablet Personal Computers (PCs)) have a single display device.

Depending on the work environment, a user of a desktop computer may split a screen of a display device horizontally or vertically to open and view multiple windows. When a web browser is executed, the user may move up or down on a web page using a Page-Up button or a Page-Down button on a keyboard. When using a mouse instead of the keyboard, the user may move up or down on a web page by holding and dragging a scroll bar on a side of the web page with a cursor of the mouse. Additionally, the user may move to the top of a web page by selecting or clicking a Top button that is displayed in text or an icon at the bottom of the web page.

Compared with the desktop computer, a mobile device has a smaller display screen, and has limited input/output capabilities. For the mobile device, it is hard for the user to split the screen during the manipulation due to its small size.

In the mobile device may be executed a variety of applications, including default applications which are installed in the device by the device manufacturer, and additional applications which are purchased from market sites on the Internet and downloaded in the device. The additional applications may be developed by general users and registered in the market sites. Thus, anyone can freely sell the applications he or she has developed to users of the mobile devices on the application market sites. Currently, therefore, the mobile devices may be provided with tens to hundreds of thousands of free or paid applications depending on the product specifications.

Although a wide variety of applications stimulating the curiosity of the consumers and meeting the needs of the consumers have been provided to mobile devices, the mobile devices are limited in size and User Interface (UI) of their display because they are manufactured having a portable size. Therefore, users may undergo difficulties in executing a plurality of applications in their mobile devices. For example, when one application is executed in a mobile device, the application is displayed in the entire display area of a display of the mobile device. If the user desires to execute another desired application, the user needs to first terminate the currently running application and then select a Run key to execute another desired application. More specifically, in order to execute multiple applications in the mobile device, the user needs to annoyingly repeat a process of executing and terminating the applications individually. There is no possible way to simultaneously execute multiple applications in the mobile device.

In the related art, when splitting one screen into multiple screens during its display, a desktop computer or a mobile device does not consider an offset between the multiple split screens. Accordingly, if a distance between the multiple split screens is relatively long, it is difficult to naturally display one screen. In the case of a screen including a character(s), it may be difficult for the user to identify the split character since the character is spilt and spaced apart far from each other.

Accordingly, there is a need for a device and method for displaying multiple screens, which can set an offset between the multiple screens.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a display device for displaying multiple screens, which can set an offset between the multiple screens, and a method for controlling the same.

In accordance with an aspect of the present invention, a method for controlling a display device that displays a frame buffer on a plurality of screens is provided. The method includes receiving a multi-screen mode execution command to display a single frame buffer on a plurality of screens, acquiring the frame buffer, splitting the frame buffer into a plurality of frame buffers to correspond to the plurality of screens, setting an offset for each of the plurality of split frame buffers, and displaying each of the plurality of split frame buffers on an associated one of the plurality of screens based on the set offset.

In accordance with another aspect of the present invention, a display device for displaying a frame buffer on a plurality of screens is provided. The display device includes an input unit configured to receive a multi-screen mode execution command to display a single frame buffer on a plurality of screens, a controller configured to acquire the frame buffer, to split the frame buffer into a plurality of frame buffers to correspond to the plurality of screens, and to set an offset for each of the plurality of split frame buffers, and a display unit configured to display each of the plurality of split frame buffers on an associated one of the plurality of screens based on the set offset.

In accordance with another aspect of the present invention, a method for controlling a first display device that performs cooperative display with a second display device is provided. The method includes transmitting a frame buffer to the second display device, splitting the frame buffer into a first frame buffer and a second frame buffer, and displaying the first frame buffer.

In accordance with another aspect of the present invention, a method for controlling a second display device that performs cooperative display with a first display device is provided. The method includes receiving a frame buffer from the first display device, splitting the frame buffer into a first frame buffer and a second frame buffer, measuring a distance between a screen of the first display device and a screen of the second display device, setting an offset of the second frame buffer based on the distance, and displaying the second frame buffer for which the offset is set.

In accordance with another aspect of the present invention, a method for controlling a first display device that performs cooperative display with a second display device is provided. The method includes splitting a frame buffer into a first frame buffer and a second frame buffer, measuring a distance between a screen of the first display device and a screen of the second display device, setting an offset of the second frame buffer based on the measured distance, transmitting the second frame buffer, to which the offset is applied, to the second display device, and displaying the first frame buffer.

In accordance with another aspect of the present invention, a method for controlling a second display device that performs cooperative display with a first display device is provided. The method includes receiving a split frame buffer which is split from a frame buffer and to which an offset is applied, which is based on a distance between a screen of the first display device and a screen of the second display device, and displaying the received split frame buffer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
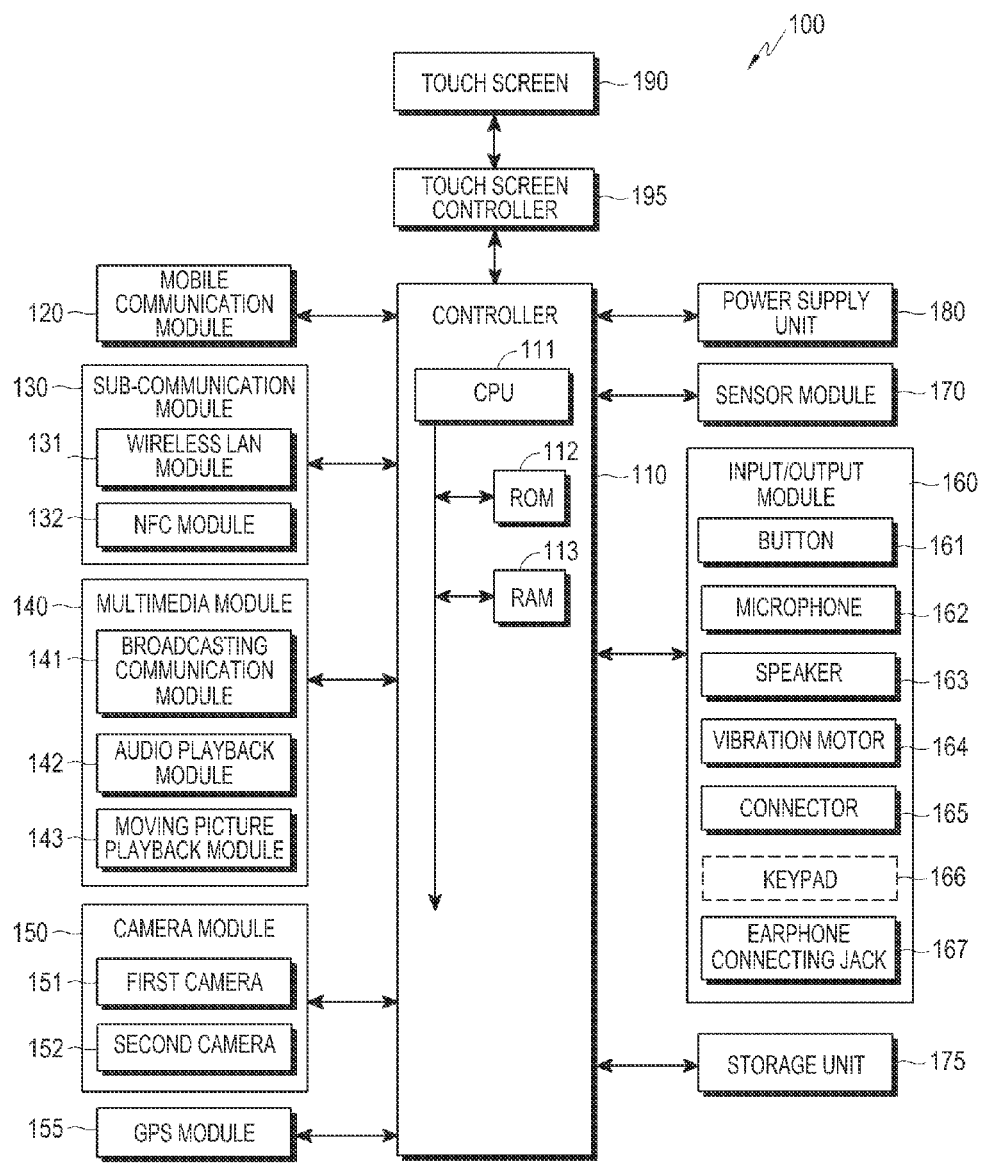
FIG. 1 is a schematic block diagram of a mobile device according to an exemplary embodiment of the present invention.

FIG. 1 is a schematic block diagram of a mobile device according to an exemplary embodiment of the present invention.

Referring to FIG. 1, a device (or mobile device) 100 may be connected to external devices (not shown) using external device connecting units such as a mobile communication module 120, a sub-communication module 130, a connector 165, and an earphone connecting jack 167. The external devices may include a variety of devices which can be attached to the device 100 and connected by wire, such as earphones, external speakers, Universal Serial Bus (USB) memories, chargers, cradles/docks, Digital Multimedia Broadcasting (DMB) antennas, Mobile payment-related devices, healthcare devices (for example, blood glucose meters), game consoles, car navigation devices, and the like. In addition, the external devices may include Bluetooth communication devices which can be wirelessly connected to the device 100 by short-range communication, short-range communication devices (for example, Near Field Communication (NFC) devices), Wireless Fidelity (Wi-Fi) Direct communication devices, and wireless Access Points (APs). Besides, the external devices may include other devices, cellular phones, smart phones, tablet PCs, desktop PCs, servers, and the like.

Referring to FIG. 1, the device 100 includes a display unit (or touch screen) 190 and a display controller (or touch screen controller) 195. In addition, the device 100 includes a controller 110, the mobile communication module 120, the sub-communication module 130, a multimedia module 140, a camera module 150, a Global Positioning System (GPS) module 155, an Input/Output (I/O) module 160, a sensor module 170, a storage unit 175, and a power supply unit 180. The sub-communication module 130 includes at least one of a Wireless Local Area Network (WLAN) module 131 and a short-range communication module 132, and the multimedia module 140 includes at least one of a broadcast communication module 141, an audio playback module 142 and a video playback module 143. The camera module 150 includes at least one of a first camera 151 and a second camera 152, and the I/O module 160 includes at least one of buttons 161, a microphone (MIC) 162, a speaker (SPK) 163, a vibration motor 164, the connector 165, a keypad 166, and the earphone connecting jack 167. It will be assumed herein that the display unit 190 and the display controller 195 are a touch screen and a touch screen controller, respectively.

The controller 110 may include a Central Processing Unit (CPU) 111, a Read Only Memory (ROM) 112 in which control programs for control of the device 100 are stored, and a Random Access Memory (RAM) 113 used as a storage area for storing signals or data received from the outside of the device 100 and carrying out operations performed in the device 100. The CPU 111 may include a single-core CPU, a dual-core CPU, a triple-core CPU, or a quad-core CPU. The CPU 111, the ROM 112 and the RAM 113 may be interconnected via an internal bus.

The controller 110 may control the mobile communication module 120, the sub-communication module 130, the multimedia module 140, the camera module 150, the GPS module 155, the I/O module 160, the sensor module 170, the storage unit 175, the power supply unit 180, the touch screen 190, and the touch screen controller 195.

The mobile communication module 120, under control of the controller 110, connects the device 100 to the external devices by mobile communication, using one or multiple antennas (not shown). The mobile communication module 120 exchanges wireless signals for voice calls, video calls, Short Message Service (SMS) messages or Multimedia Messaging Service (MMS) messages with cellular phones (not shown), smart phones (not shown), tablet PCs (not shown), and other devices (not shown), which have the phone numbers entered or registered in the device 100.

The sub-communication module 130 may include at least one of the WLAN module 131 and the short-range communication module 132. For example, the sub-communication module 130 may include any one or both of the WLAN module 131 and the short-range communication module 132.

The WLAN module 131, under control of the controller 110, may be connected to the Internet in the places where a wireless AP (not shown) is installed. The WLAN module 131 supports the WLAN standard IEEE802.11x defined by the Institute of Electrical and Electronics Engineers (IEEE). The short-range communication module 132, under control of the controller 110, may perform wireless short-range communication between the device 100 and image forming devices (not shown). The short-range communication may include Bluetooth, Infrared Data Association (IrDA), Wi-Fi Direct, and NFC.

The device 100 may include at least one of the mobile communication module 120, the WLAN module 131 and the short-range communication module 132 depending on its performance. For example, the device 100 may include a combination of the mobile communication module 120, the WLAN module 131 and the short-range communication module 132 depending on its intended use and performance.

The multimedia module 140 may include the broadcast communication module 141, the audio playback module 142 or the video playback module 143. The broadcast communication module 141, under control of the controller 110, may receive broadcast signals (for example, TV broadcast signals, radio broadcast signals, or data broadcast signals) and additional broadcast information (for example, Electric Program Guide (EPG) or Electric Service Guide (ESG)), which are transmitted from the broadcasting stations via broadcast communication antennas (not shown). The audio playback module 142, under control of the controller 110, may play digital audio files (with a file extension of, for example, mp3, wma, ogg, way, etc.), which are stored or received in/at the device 100. The video playback module 143, under control of the controller 110, may play digital video files (with a file extension of, for example, mpeg, mpg, mp4, avi, mov, mkv, etc.), which are stored or received in/at the device 100. The video playback module 143 may play digital audio files as well.

The multimedia module 140 may include only the audio playback module 142 and the video playback module 143, excluding the broadcast communication module 141. The audio playback module 142 and the video playback module 143 in the multimedia module 140 may be incorporated into the controller 110.

The camera module 150 may include at least one of the first camera 151 and the second camera 152, each of which may capture still or video images under control of the controller 110. In addition, the first camera 151 or the second camera 152 may include a secondary light source (for example, a flash (not shown)), which provides the amount of light needed for capturing an image. The first camera 151 may be disposed on the front of the device 100, while the second camera 152 may be disposed on the back of the device 100. Alternatively, the first camera 151 and the second camera 152 may be disposed adjacent with a gap greater than 1 cm and less than 8 cm, to capture three-dimensional (3D) still or video images.

The GPS module 155 may receive radio waves from multiple GPS satellites (not shown) in the Earth orbit, and calculate the location of the device 100 using the Time of Arrival (ToA) from the GPS satellites to the device 100.

The I/O module 160 may include at least one of the multiple buttons 161, the microphone 162, the speaker 163, the vibration motor 164, the connector 165, and the keypad 166.

The buttons 161 may be formed on the front, side, or rear of the housing of the device 100, and may include at least one of a power/lock button (not shown), a volume button (not shown), a menu button (not shown), a home button (not shown), a back button (not shown), and a search button (not shown).

The microphone 162 generates electrical audio signals by receiving voices or sounds, under control of the controller 110.

The speaker 163, under control of the controller 110, may output sounds corresponding to various signals (for example, wireless signals, broadcast signals, digital audio files, digital video files, photo-shoot signals, etc.) from the mobile communication module 120, the sub-communication module 130, the multimedia module 140 or the camera module 150, to the outside of the device 100. The speaker 163 may output sounds (for example, button manipulation tones for phone calls, ring back tones, etc.) corresponding to the functions performed by the device 100. One or multiple speakers 163 may be formed in a proper position(s) of the housing of the device 100.

The vibration motor 164 may convert electrical signals into mechanical vibrations under control of the controller 110. For example, the vibration motor 164 operates if the device 100 in a vibration mode receives a voice call from another device (not shown). One or multiple vibration motors 164 may be formed in the housing of the device 100. The vibration motor 164 may operate in response to the user's touch action occurring on the touch screen 190 and the continuous movement of a touch on the touch action 190.

The connector 165 may be used as an interface for connecting the device 100 to external devices (not shown) or a power source (not shown). The device 100, under control of the controller 110, may transmit data stored in its storage unit 175 to the external devices (not shown) or receive data from the external devices, through a wired cable connected to the connector 165. The device 100 may receive power from a power source (not shown) or charge a rechargeable battery (not shown) using the power source, through the wired cable connected to the connector 165.

The keypad 166 may receive key inputs from the user, for control of the device 100. The keypad 166 includes a physical keypad (not show) formed on the device 100 or a virtual keypad (not shown) displayed on the touch screen 190. The physical keypad (not show) formed on the device 100 may be optional depending on the performance or structure of the device 100.

In the earphone connecting jack 167 may be inserted an earphone (not shown) for connection to the device 100.

The sensor module 170 includes at least one sensor for detecting the status of the device 100. For example, the sensor module 170 may include at least one of a proximity sensor (not shown) for detecting whether the user is close to the device 100, a luminance sensor (not shown) for detecting the amount of light around the device 100, a motion sensor (not shown) for detecting motion (for example, rotation, acceleration, vibration, etc.) of the device 100, a geo-magnetic sensor (not shown) for detecting the point of compass using the Earth's magnetic field, a gravity sensor (not shown) for detecting the direction of gravity, and an altimeter (not shown) for detecting the altitude by measuring the pressure of the atmosphere. At least one of the sensors may detect the status of the device 100, generate a detection signal corresponding to the detection, and transfer the detection signal to the controller 110. Sensors may be added or removed to/from the sensor module 170 depending on the performance of the device 100.

The storage unit 175, under control of the controller 110, may store the signals or data which are received and output to correspond to operations of the mobile communication module 120, the sub-communication module 130, the multimedia module 140, the camera module 150, the GPS module 155, the I/O module 160, the sensor module 170, and the touch screen 190. The storage unit 175 may store control programs for control of the device 100 or the controller 110, and a variety of applications.

The term 'storage unit' as used herein may be construed to include the storage unit 175, the ROM 112 and RAM 113 in the controller 110, or a memory card (not shown; for example, a Secure Digital (SD) card, a memory stick, etc.) that is mounted in the device 100. The storage unit may include nonvolatile memories, volatile memories, Hard Disk Drives (HDDs), Solid State Drives (SSDs), etc.

The power supply unit 180, under control of the controller 110, may supply power to one or multiple batteries (not shown) mounted in the housing of the device 100. The one or multiple batteries supply power to the device 100. The power supply unit 180 may also supply the power received from an external power source (not shown) to the device 100 through a wired cable connected to the connector 165. The power supply unit 180 may also supply the power that is wirelessly received from the external power source, to the device 100 by wireless charging technology.

The touch screen 190 may provide the user with a variety of user interfaces corresponding to a variety of services (for example, calls, data transmission, broadcasting, photo shooting, etc.). The touch screen 190 may transfer analog signals corresponding to at least one touch entered on the user interfaces, to the touch screen controller 195. The touch screen 190 may receive at least one touch by a user's body (for example, fingers including the thumb) or a touch input means (for example, a stylus pen). The touch screen 190 may receive continuous movement of a touch among at least one touch. The touch screen 190 may transfer analog signals corresponding to the received continuous movement of a touch, to the touch screen controller 195.

In an exemplary implementation, the touch is not limited to the contact touches between the touch screen 190 and the user's body or the touch input means, but may include noncontact touches (with a contactless detectable gap of, for example, about 1 mm between the touch screen 190 and the user's body or the touch input means). The detectable gap on the touch screen 190 is subject to change depending on the performance or structure of the device 100, and the touch screen 190 may be configured to output different detection values (for example, current values) for a touch event by the contact with the user's body or the touch input means, and a noncontact touch event (for example, hovering).

The touch screen 190 may be implemented in, for example, a resistive type, a capacitive type, an infrared type, an acoustic wave type, and the like.

The touch screen controller 195 converts analog signals received from the touch screen 190 into digital signals (for example, X and Y coordinates) and transfers them to the controller 110. The controller 110 may control the touch screen 190 using the digital signals received from the touch screen controller 195. For example, the controller 110 may select or execute shortcut icons (not shown) displayed on the touch screen 190 in response to touch events. The touch screen controller 195 may be incorporated into the controller 110.

The touch screen 190 may include at least two touch screen panels, each of which can detect the touch or proximity of the user's body and the touch input means, so as to receive the inputs by both the user's body and the touch input means. The at least two touch screen panels provide different output values to the touch screen controller 195, and the touch screen controller 195 may determine whether an input from the touch screen 190 is a touch input by the user's body or a touch input by the touch input means, by differently recognizing the input values received from the at least two touch screen panels.

The touch screen 190 may include a coil electrode unit for position measurement, which includes, for example, at least one loop coil capable of receiving Electro-Magnetic Resonance (EMR) signals. The coil electrode unit for position measurement transmits transmission (Tx) signals to an EMR pen for a first period. The transmitted transmission signals may be absorbed into the EMR pen. For a second period, the EMR pen transmits received (Rx) signals to the device 100 based on the absorbed transmission signals. The device 100 may recognize input coordinates of the EMR pen based on the Rx signals received from the EMR pen. The device 100 may recognize the placement of the EMR pen even though the EMR pen does not directly touch the touch screen 190. The device 100 may also recognize the placement of part of the user's body.

Accordingly, the controller 110 may measure how close the EMR pen or the like is placed near the device 100. In addition, the controller 110 may determine that the EMR pen is withdrawn from the device 100. For example, the controller 110 may determine that the EMR pen is withdrawn from the device 100 if the strength of the Rx signal received from the EMR pen is lower than a predetermined threshold. The controller 100 may determine that the EMR pen is placed near the device 100 if the strength of the Rx signal received from the EMR pen exceeds a predetermined threshold.

The touch screen 190, which will be described in more detail below, may receive inputs from the user, so it may be referred to as an input unit. The touch screen 190 may also be referred to as a display unit since it displays a predetermined screen. The input unit and the display unit may be implemented with a single hardware unit, or independent hardware units.

Figure 2:
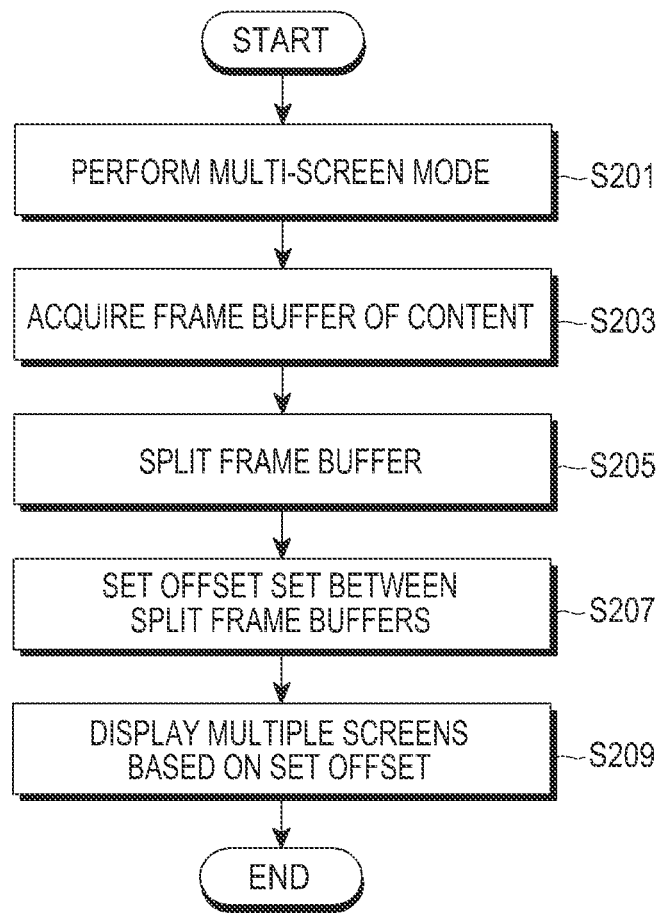
FIG. 2 is a flowchart illustrating a method for setting an offset according to an exemplary embodiment of the present invention.

FIG. 2 is a flowchart illustrating a method for setting an offset according to an exemplary embodiment of the present invention. The offset setting method of FIG. 2 will be further described with reference to FIGS. 3A to 3D which are conceptual diagrams illustrating screens according to an exemplary embodiments of the present invention.

Figure 3A:
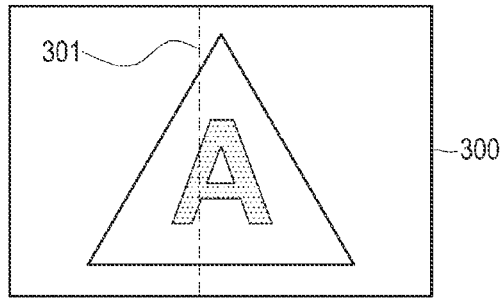
FIGS. 3A to 3D are conceptual diagrams illustrating screens according to an exemplary embodiments of the present invention.

Referring to FIG. 2, a display device may receive a multi-screen mode execution command in step S201. The display device may display a specific image frame before executing a multi-screen mode. For example, the display device may display an image frame 300 as shown in FIG. 3A. The image frame 300 in FIG. 3A includes a triangular shape at the center, and includes an English alphabet "A" within the triangular shape. The multi-screen mode means a mode in which one image frame is split into multiple image frames and displayed on multiple screens.

A user may want to split a specific image frame that he or she is watching, into multiple image frames, and watch them on multiple screens. The user may enter a multi-screen mode execution command.

The multi-screen mode is a mode in which a specific image frame is split into multiple image frames and displayed on multiple screens. More specifically, in the multi-screen mode, the multiple screens may be displayed with a predetermined gap. For example, the multi-screen mode may be a mode in which one image frame is split into two image frames (for example, left and right image frames) on the basis of a predetermined split boundary line 301, and the split two screens are displayed with a predetermined gap. However, splitting one screen into two screens is a mere example, and the display device may split an image frame into a different number of image frames, and arrange them in a variety of ways.

The user may enter the split boundary line 301 along with the multi-screen mode execution command. The split boundary line 301 means a boundary along which the image frame 300 is split. The user may enter the split boundary line 301 in person. For example, the display device provides an interface by which the user may enter the split boundary line 301, and the user may enter the split boundary line 301 on a touch screen of the display device. The user may enter the split boundary line 301 by performing a drag action on the touch screen. The user may also enter the split boundary line 301 by shifting the position of the split boundary line 301. It will be apparent to those of ordinary skill in the art that the way to enter the split boundary line 301 may be changed in a variety of ways. The display device may also determine the split boundary line 301 by itself, without the user's input. For example, the display device may determine the split boundary line 301 of the image frame 300 depending on the size of each of the split screens.

Upon receiving the multi-screen mode execution command in step S201, the display device acquires a frame buffer of the content that it is displaying, in step S203. More specifically, the display device acquires the image frame in FIG. 3A as a frame buffer. In addition, when displaying video, the display device acquires a plurality of image frames constituting the video.

In step S205, the display device splits the acquired frame buffer. For example, the display device may split the frame buffer into left and right frame buffers on the basis of the split boundary line 301, as shown in FIG. 3A.

In step S207, the display device may set an offset between the split frame buffers. The offset may mean a difference between a display end point of one split frame buffer and a display start point of another split frame buffer. For example, the display device may split the frame buffer into a left frame buffer and a right frame buffer on the basis of the split boundary line 301 as shown in FIG. 3A. The left frame buffer will be referred to as a first frame buffer and the right frame buffer will be referred to as a second frame buffer.

Figure 3B:
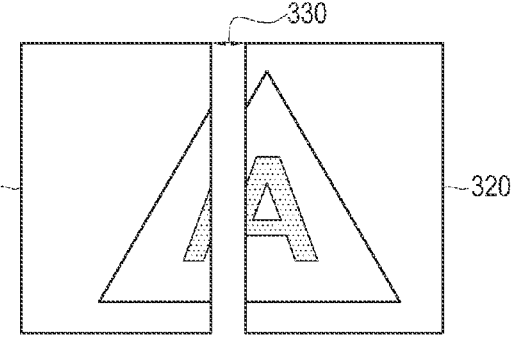

FIG. 3B illustrates a screen in which an offset of a second frame buffer is set as '0'. The display device may set an offset of a second frame buffer 320 as 0 automatically or by a user's input. In other words, the display device may set a display start point of the second frame buffer 320 to be the same as a display end point of a first frame buffer 310. In step S209, the display device may display the first frame buffer 310 and the second frame buffer 320 with a predetermined gap 330. If the offset is set by the user's input, the display device may provide an interface by which the user may set an offset.

Figure 3C:
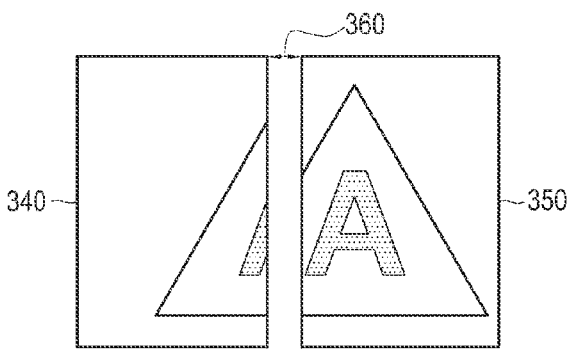

FIG. 3C illustrates a screen in which an offset of a second frame buffer is set as a negative value. The display device may set a display start point of a second frame buffer 350 to go ahead of a display end point of a first frame buffer 340. As shown in FIG. 3C, it can be appreciated that since the display start point of the second frame buffer 350 is set to go ahead of the display end point of the first frame buffer 340, the English alphabet "A" is displayed to be identifiable. The user may manipulate the display device so that the offset may be to be set as a negative value. Accordingly, the user may set the offset so that characters such as English alphabets may be easily identified. The display device may display the first frame buffer 340 and the second frame buffer 350 with a predetermined gap 360.

In addition, the display device may automatically set the offset of the second frame buffer 350. The display device may determine whether a character such as an English alphabet "A" exists in the entire frame buffer. If it is determined that a character exists, the display device may set the offset so that the whole character may be displayed in any one of the first frame buffer 340 and the second frame buffer 350. In FIG. 3C, the display device sets the offset of the second frame buffer 350 as a negative value by way of an example. Depending on the position of a character, the display device may set the offset as a negative or positive value so that the whole character may be included in a frame buffer.

For example, the display device may display the whole character of an English alphabet "A" in the second frame buffer 350 by setting the offset of the second frame buffer 350 as shown in FIG. 3C. In addition, if an object that needs to be displayed without being split, such as a character or a person's face, exists in the frame buffer, the display device may set the offset so that the whole object may be displayed in any one frame buffer. For example, the display device may determine whether a person's face exists in the frame buffer, based on a conventional face recognition method, and may set the offset so that the whole person's face may be displayed in any one split frame buffer. Thus, the user may set the offset by manipulating the display device so that the whole person's face may be displayed in any one split frame buffer. The display device may further include a component for determining whether a character is included in a frame buffer, or a component for determining whether a person's face is included in a frame buffer.

Figure 3D:
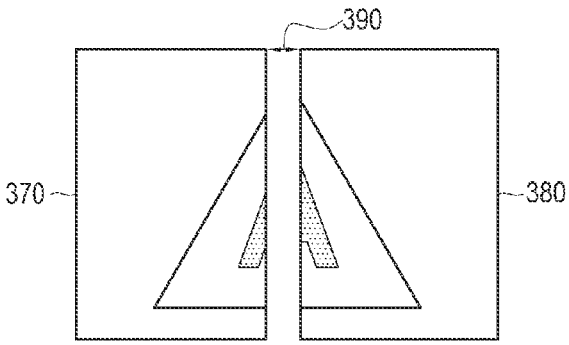

FIG. 3D illustrates a screen in which an offset of a second frame buffer is set as a positive value according to another exemplary embodiment of the present invention. The display device may set an offset of a second frame buffer 380 as a positive value. In other words, the display device may set a display start point of the second display buffer 380 to fall behind a display end point of a first display buffer 370. The display device may display the first frame buffer 370 and the second frame buffer 380 with a predetermined gap 390. In particular, by setting the offset of the second frame buffer 380 as a positive value, the display device may display the frame buffers as if the entire frame buffer is hidden by the gap 390. More specifically, the display device may display the frame buffers as if one image continues over the first frame buffer 370 and the second frame buffer 380 by setting the offset of the second frame buffer 380 as a positive value. Accordingly, the display device may display the frame buffers as if one image is hidden by the gap 390.

As described above, the display device may set an offset of the split frame buffer automatically or by the user. In addition, the display device may set the offset in a variety of ways based on a variety of circumstances.

Figure 4:
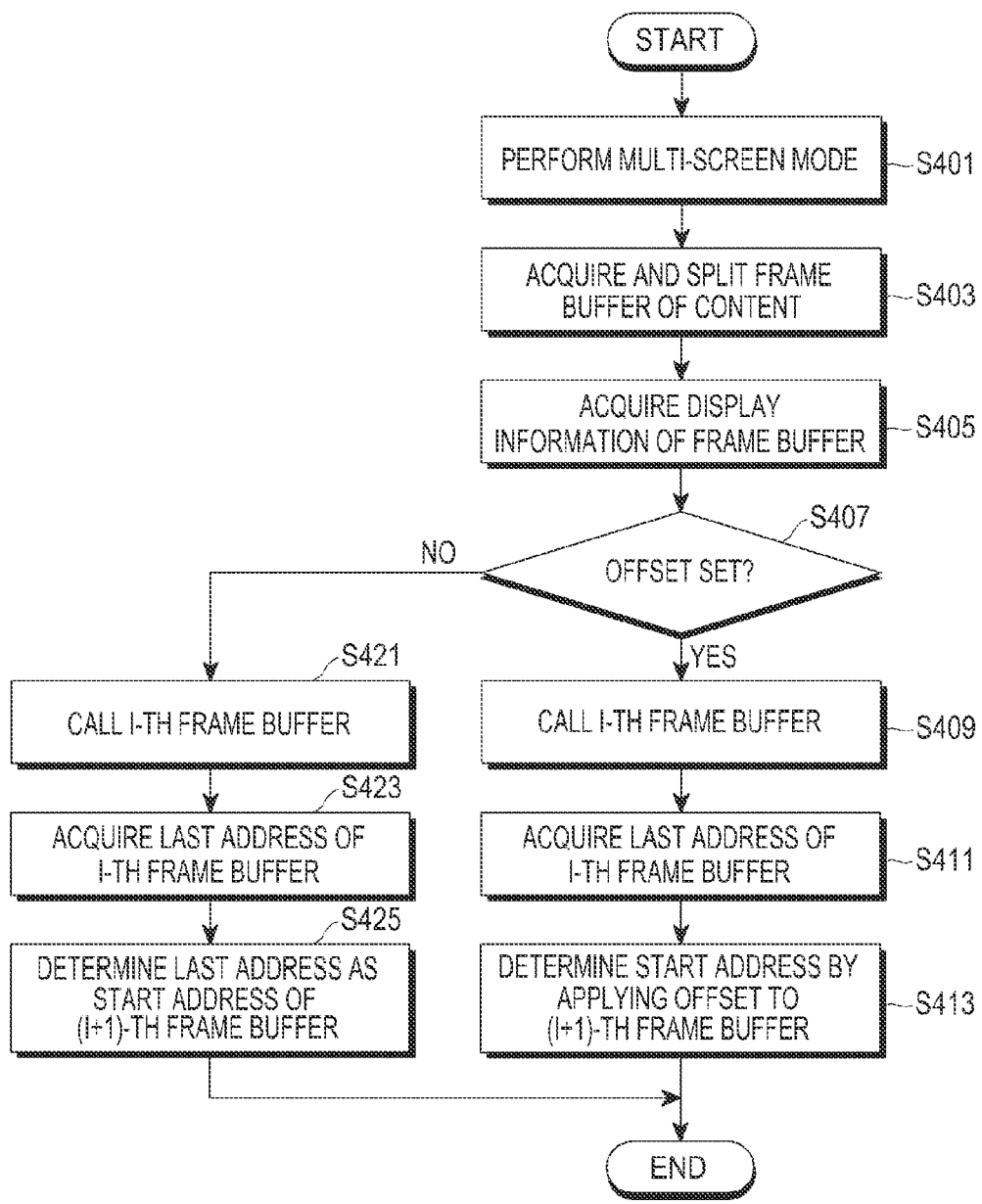
FIG. 4 is a flowchart illustrating a method for setting an offset according to an exemplary embodiment of the present invention.

FIG. 4 is a flowchart illustrating a method for setting an offset according to an exemplary embodiment of the present invention. The offset setting method of FIG. 4 will be described with reference to FIG. 5, which is a conceptual diagram illustrating a frame buffer and screens displaying a frame buffer according to an exemplary embodiment of the present invention, and with reference to FIGS. 6A to 6C, which are conceptual diagrams illustrating display addresses of frame buffers according to exemplary embodiments of the present invention.

Figure 5:
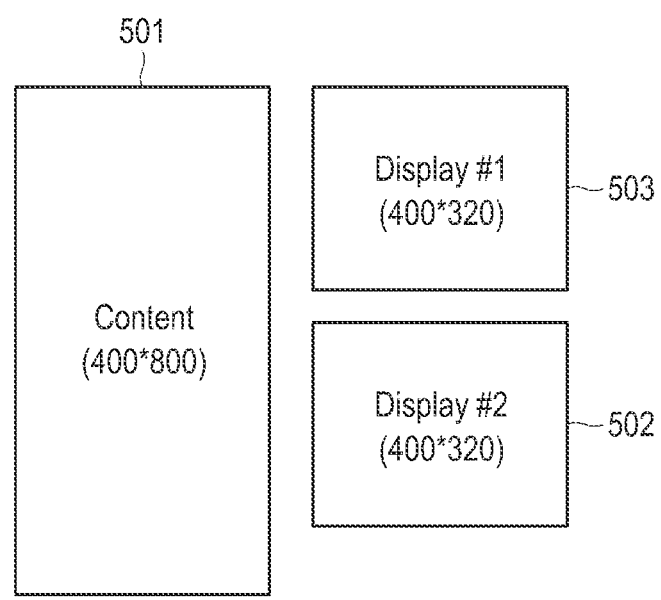
FIG. 5 is a conceptual diagram illustrating a frame buffer and screens displaying a frame buffer according to an exemplary embodiment of the present invention.

Referring to FIG. 4, a display device may execute a multi-screen mode in step S401. Reference will be made to FIG. 5, for a description of step S401. If the multi-screen mode is executed, the display device may acquire a frame buffer 501 of content that it is displaying, in step S403. For example, the display device may be assumed to split the acquired frame buffer 501 into m frame buffers, where m is 2 in FIG. 5.

The display device may determine the number 'm' of splits depending on the number of screens to be displayed. For example, it will be assumed that the display device may display a content buffer on two screens as shown in FIG. 5. That is, the display device may include a first screen 503 and a second screen 502. The first screen 503 and the second screen 502 may be areas which are spaced apart with a predetermined gap on a display unit of the display device. The frame buffer 501 may have a size of 400*800, and the first and second screens 503 and 502 may have a size of 400*320.

Figure 6A:
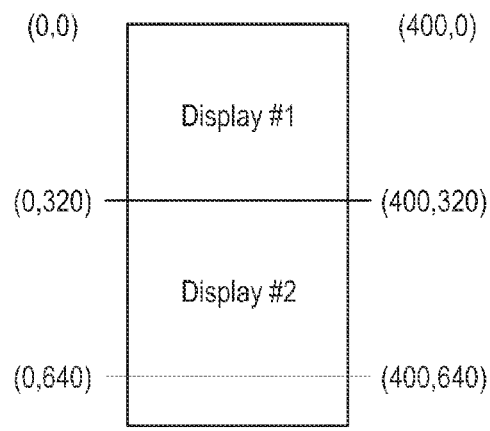
FIGS. 6A to 6C are conceptual diagrams illustrating display addresses of frame buffers according to exemplary embodiments of the present invention.

The display device splits the acquired frame buffer 501 into a first frame buffer and a second frame buffer. The first frame buffer is a frame buffer displayed on the first display 503, and the second frame buffer is a frame buffer displayed on the second display 502. For example, the display device may split a frame buffer into a first frame buffer and a second frame buffer as shown in FIG. 6A.

In step S405, the display device may acquire display information for each of the split frame buffers. The display device may acquire information about addresses of a display start point and a display end point for each of the split frame buffers. For example, the display device may acquire information indicating that the address of a display start point of the first frame buffer is a straight line connecting (0,0) and (400,0), and information indicating that the address of a display end point of the first frame is a straight line connecting (0,320) and (400,320). The display device may acquire information indicating that the address of a display start point of the second frame buffer is a straight line connecting (0,320) and (400,320), and information indicating that the address of a display end point of the second frame buffer is a straight line connecting (0,640) and (400,640). The display device acquires the above-described information about the addresses of a display start point and a display end point for each of the split frame buffers.

In step 407, the display device may determine if an offset is set and may set an offset for each of the split frame buffers (in case of Yes in step S407). On the other hand, the display device may not set the offset (in case of No in step S407).

When determining to set an offset for each of the split frame buffers (Yes in step S407), the display device may call an i-th split frame buffer in step S409, where i may be an integer from 1 to m−1. In other words, the display device may first call a first frame buffer. In step S411, the display device acquires an address of a display end point of the i-th split frame buffer. More specifically, the display device acquires information indicating that the address of a display end point of the first frame buffer is a straight line connecting (0,320) and (400,320).

In step S413, the display device may determine a display start address of an (i+1)-th frame buffer by applying an offset. For example, the display device may determine a display start address of the second frame buffer by applying an offset. The display device may set an offset of the second frame buffer as '−10'. The display device may set an offset of the second frame buffer automatically or based on a user input. More specifically, the display device may determine a display start address of the next split frame buffer by applying the offset to a display end address of the previous split frame buffer.

The display device may determine the display start address of the second frame buffer as a straight line connecting (0,310) and (400,310), which are determined by applying the offset of '−10' to the straight line connecting (0,320) and (400,320). In addition, the display device may determine the display end address of the second frame buffer as a straight line connecting (0,630) and (400,630), which are determined by applying the offset of '−10' to the straight line connecting (0,640) and (400,640).

Figure 6B:
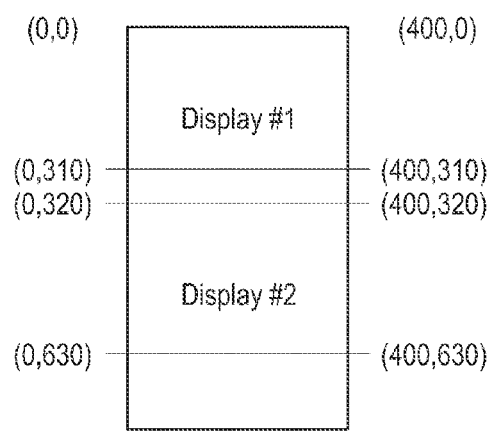

The display device may display the second frame buffer on the second screen 502 based on the set address of the second frame buffer. More specifically, the display device may display an area between the straight line connecting (0,310) and (400,310) and the straight line connecting (0,630) and (400,630) of the frame buffer 501, on the second screen 502. For example, the display device may display the second frame buffer on the second screen 502 as shown in FIG. 6B.

If m is 3 or more, the display device may determine a display start address and a display end address for each of third to m-th frame buffers by applying an offset, to display the frame buffers.

On the other hand, when determining not to set an offset (No in step S407), the display device calls an i-th frame buffer in step S421. The display device acquires a display end address of the i-th frame buffer in step S423, and determines the display end address of the i-th frame buffer as a display start address of an (i+1)-th frame buffer in step S425.

Figure 6C:
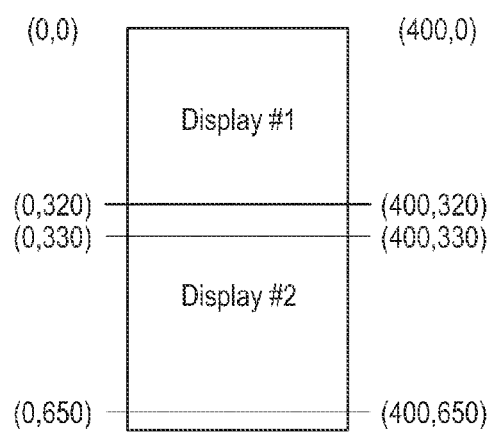

FIG. 6C is a conceptual diagram for a case where an offset is set as '+10' according to another exemplary embodiment of the present invention. The display device may determine a display start address of the second frame buffer as a straight line connecting (0,330) and (400,330), which are determined by applying an offset of '+10' to the straight line connecting (0,320) and (400,320). In addition, the display device may determine a display end address of the second frame buffer as a straight line connecting (0,650) and (400,650), which are determined by applying the offset of '+10' to the straight line connecting (0,640) and (400,640).

The display device may display the second frame buffer on the second screen 520 based on the set address of the second frame buffer. More specifically, the display device may display an area between the straight line connecting (0,330) and (400,330) and a straight light connecting (0,650) and (400,650) of the frame buffer 501, on the second screen 502.

Figure 7:
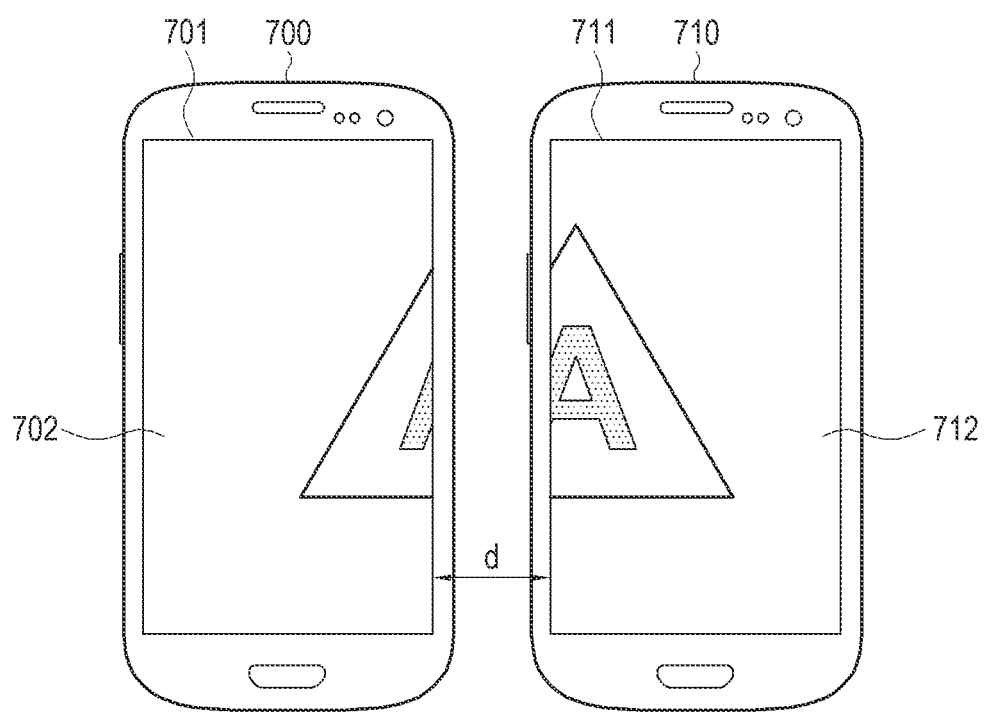
FIG. 7 is a conceptual diagram illustrating cooperative display according to an exemplary embodiment of the present invention.

FIG. 7 is a conceptual diagram illustrating cooperative display according to another exemplary embodiment of the present invention.

Referring to FIG. 7, a first screen 701 of a first display device 700 and a second screen 711 of a second display device 710 may be disposed with a predetermined gap of 'd'. The first display device 700 and the second display device 710 may display one buffer frame in cooperation. The first display device 700 displays a first frame buffer 702 on the first screen 701, and the second display device 710 displays a second frame buffer 712 on the second screen 711.

For example, the first display device 700 may split a frame buffer into the first frame buffer 702 and the second frame buffer 712. The first display device 700 may transmit data of the second frame buffer 712 to the second display device 710. For example, the first display device 700 may transmit data of the second frame buffer 712 based on at least one of communication schemes including Zig-Bee, Bluetooth, Bluetooth Low Energy (BLE), Near Field Communication (NFC), Visual Light Communication (VLC), Infrared Data Association (IrDA), and the like.

Figure 8A:
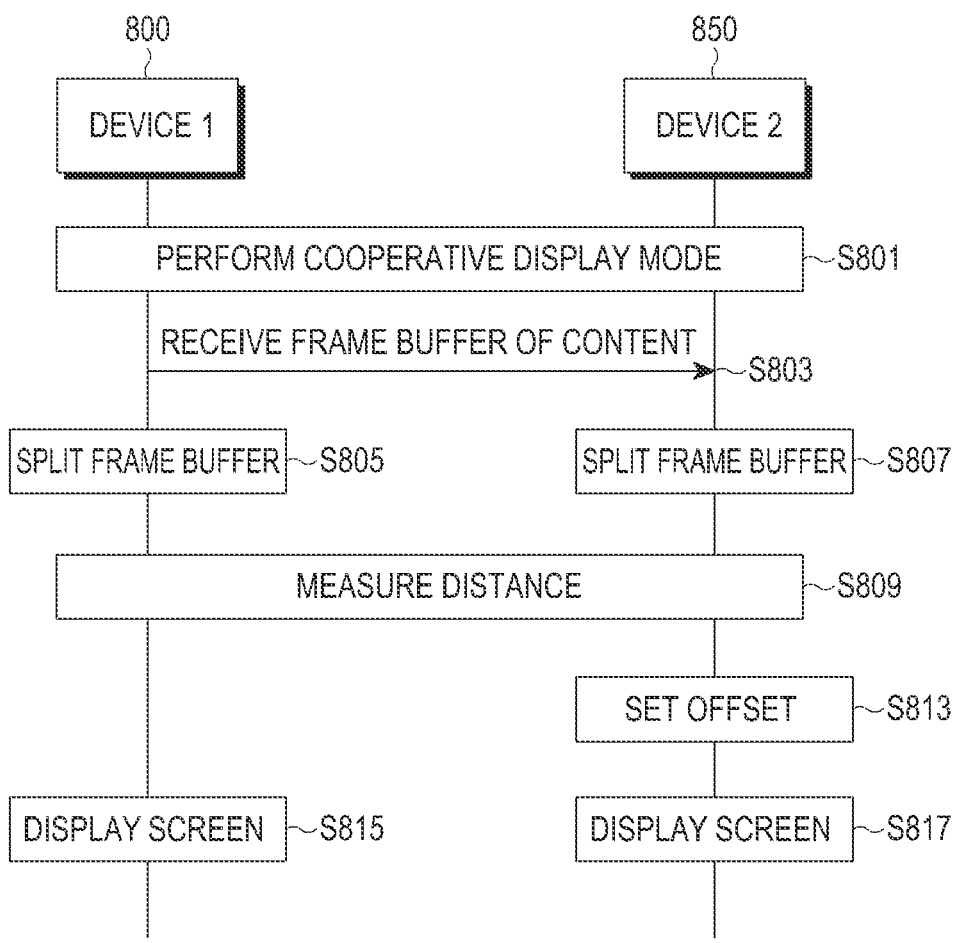
FIGS. 8A and 8B are flow diagrams illustrating a cooperative display method according to exemplary embodiments of the present invention.

FIG. 8A is a flowchart illustrating operations of a first display device and a second display device according to an exemplary embodiment of the present invention.

Referring to FIG. 8A, a first display device 800 and a second display device 850 may perform a cooperative display mode in step S801. The cooperative display mode is a mode in which two or more display devices may display one frame buffer in cooperation. More specifically, in this mode, two or more display devices may split one frame buffer into multiple frame buffers and display the split frame buffers on their own screens. It will be assumed herein that the second display device 850 displays the frame buffer displayed by the first display device 800, in cooperation.

In step S803, the first display device 800 may transmit a frame buffer of content to the second display device 850. In steps S805 and S807, the first display device 800 and the second display device 850 may split the frame buffer, respectively. For example, the first display device 800 may split the frame buffer into a first frame buffer and a second frame buffer in step S805. The second display device 850 may split the frame buffer into a first frame buffer and a second frame buffer in step S807.

In step S809, the first display device 800 and the second display device 850 may measure a distance between a screen of the first display device 800 and a screen of the second display device 850. In step S813, the second display device 850 may set an offset of the second frame buffer based on the measured distance.

The first display device 800 may display the first frame buffer on its screen in step S815. In addition, the second display device 850 may display the second frame buffer, to which the offset is applied, on its screen in step S817.

Figure 8B:
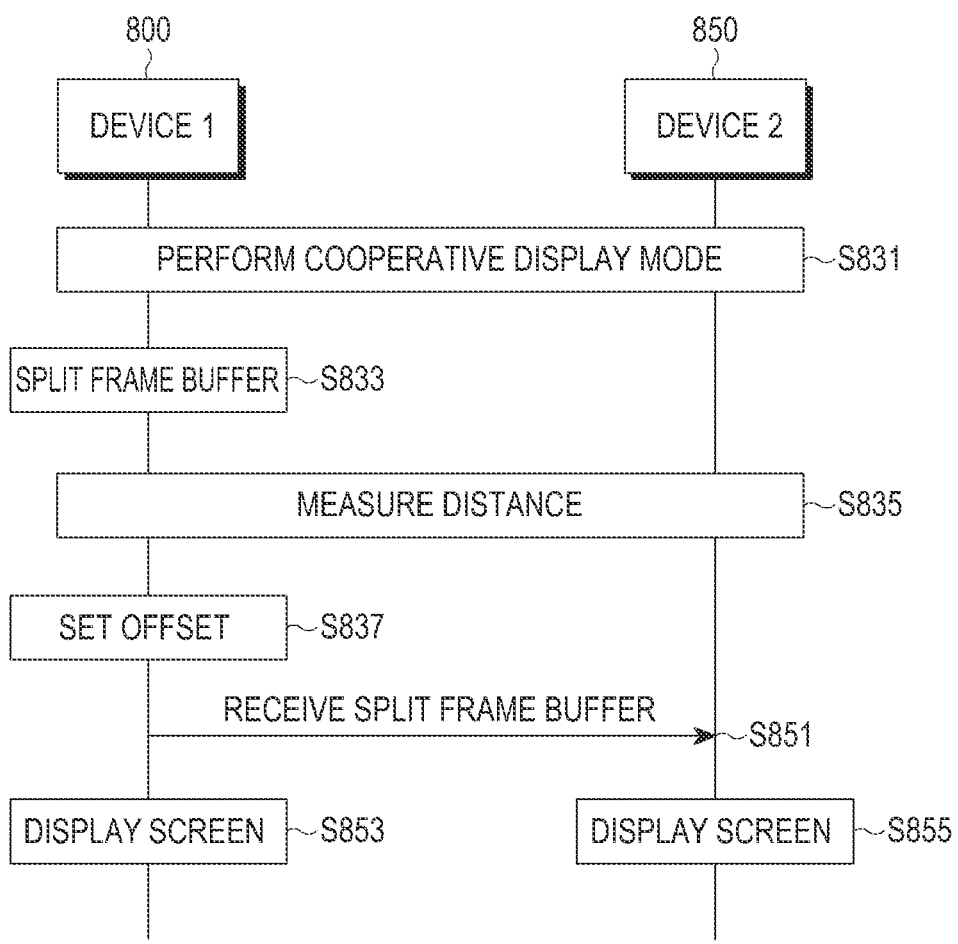

FIG. 8B is a flowchart illustrating operations of a first display device and a second display device according to another exemplary embodiment of the present invention.

Referring to FIG. 8B, a first display device 800 and a second display device 850 may perform a cooperative display mode in step S831. The first display device 800 may split a frame buffer into a first frame buffer and a second frame buffer in step S833. In step S835, the first display device 800 and the second display device 850 may measure a distance between a screen of the first display device 800 and a screen of the second display device 850.

In step S837, the first display device 800 may set an offset of the second frame buffer based on the measured distance. In step S851, the first display device 800 transmits data of the second frame buffer, to which the offset is applied, to the second display device 850.

The first display device 800 displays the first frame buffer on its screen in step S853, and the second display device 850 displays the received second frame buffer on its screen in step S855.

It will be appreciated that exemplary embodiments of the present invention may be implemented in the form of hardware, software or a combination of hardware and software. The software may be stored in volatile or nonvolatile storage devices (such as, for example, erasable or re-writable Ready Only Memories (ROMs), memories (such as, for example, Random Access Memories (RAMs), and memory chips, devices or Integrated Circuits (ICs), or storage media which is optically or magnetically recordable and readable by machine (for example, a computer) (such as, for example, Compact Disks (CDs), Digital Versatile Disks (DVDs), magnetic disks or magnetic tapes). The multi-screen display method proposed by exemplary embodiments of the present invention may be implemented by computers or mobile terminals including a controller and a memory. The memory is an example of machine-readable storage media suitable to store a program or programs including instructions for implementing exemplary embodiments of the present invention. Therefore, the present invention includes programs including codes for implementing the device or method defined in any claims of the specification, and machine-readable (or computer-readable) storage media storing these programs. These programs may be electronically transferred through any media such as communication signals transmitted through wire/wireless connections, and the present invention may properly include their equivalents.

As is apparent from the foregoing description, the present invention provides a display device for displaying multiple screens, which can set an offset between the multiple screens, and a method for controlling the same. The display device may split an image frame into multiple image frames and naturally display them on split screens.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a first display device, the method comprising:
    acquiring an image and a split boundary line to split the image to a plurality of parts;
    determining whether an object is included in the image;
    splitting the image to a first part of the image and a second part of the image according to the split boundary line;

recognizing whether at least part of the object is missed from the first part of the image or from the second part of the image;

in response to recognizing that at least part of the object is missed from the first part of the image adding the at least part of the object to the first part of the image;

displaying the first part of the image or the second part of the image; and transmitting a remaining part of the image which is not displayed to a second display device such that the remaining part of the image is displayed on the second display device, wherein the first part of the image entirely includes the object and the second part of the image includes the at least part of the object.

2. The method of claim 1, wherein the splitting of the image to the first part of the image and the second part of the image comprises determining an offset between the first part of the image and the second part of the image, and wherein the offset is a difference between a display end point of the first part of the image and a display start point of the second part of the image.

3. The method of claim 1, wherein the determining of whether the object is included in the image comprises determining whether a character or a person's face is included in the image.

4. The method of claim 3, wherein an overall shape of the character or an overall shape of the person's face is included in the first part of the image.

5. The method of claim 1, wherein the second part of the image is displayed on a screen of the second display device while the first display device displays the first part of the image.

6. A first display device, comprising:
a display unit;
a transceiver; and
a processor configured to:
acquire an image and a split boundary line to split the image to a plurality of parts,
determine whether an object is included in the image,
split the image to a first part of the image and a second part of the image according to the split boundary line,
recognize whether at least part of the object is missed from the first part of the image or from the second part of the image,
in response to recognizing that at least part of the object is missed from the first part of the image, add the at least part of the object to the first part of the image,
control the display unit to display the first part of the image or the second part of the image, and
control the transceiver to transmit a remaining part of the image which is not displayed to a second display device, such that the remaining part of the image is displayed on the second display device,
wherein the first part of the image entirely includes the object and the second part of the image includes the at least part of the object.

7. The first display device of claim 6,
wherein the processor is further configured to determine an offset between the first part of the image and the second part of the image, and
wherein the offset is a difference between a display end point of the first part of the image and a display start point of the second part of the image.

8. The first display device of claim 6, wherein the processor is further configured to determine whether a character or a person's face is included in the image.

9. The first display device of claim 8, wherein an overall shape of the character or an overall shape of the person's face is included in the first part of the image.

10. The first display device of claim 6, wherein the second part of the image is displayed on a display unit of the second display device while the display unit displays the first part of the image.

* * * * *